United States Patent [19]

Esposito

[11] Patent Number: 4,814,375
[45] Date of Patent: Mar. 21, 1989

[54] HIGH STRENGTH ELASTOMERS FOR PHARMACEUTICAL PRODUCTS

[75] Inventor: Anthony S. Esposito, Phoenixville, Pa.

[73] Assignee: The West Company, Pa.

[21] Appl. No.: 100,755

[22] Filed: Sep. 24, 1987

[51] Int. Cl.$^4$ .............................................. C08L 53/02
[52] U.S. Cl. ..................................... 524/505; 525/93; 525/98
[58] Field of Search .................... 524/505; 525/94, 98, 525/93

[56] References Cited

U.S. PATENT DOCUMENTS

| | | | |
|---|---|---|---|
| 3,562,356 | 2/1971 | Nyberg | 525/93 |
| 3,792,124 | 2/1974 | Davison | 525/98 |
| 4,107,233 | 8/1978 | Hansen | 525/93 |
| 4,199,490 | 4/1980 | Kamiya | 524/505 |
| 4,264,747 | 4/1981 | Paddock | 525/98 |
| 4,286,077 | 8/1981 | St. Clair | 525/93 |
| 4,393,170 | 7/1983 | Haws | 524/505 |
| 4,440,815 | 4/1984 | Zomorodi | 524/505 |
| 4,588,777 | 5/1986 | Hotta | 525/98 |

Primary Examiner—John C. Bleutge
Assistant Examiner—David Buttner
Attorney, Agent, or Firm—Eugene E. Renz, Jr.

[57] ABSTRACT

A soft, high strength thermoplastic elastomeric composition for use in medical and pharmaceutical products, comprising an ethylene butylene block copolymer having terminal polystyrene units, a platicizer in an amount sufficient to soften the ethylene butylene phase of the copolymer, and a thermoplastic acrylic resin in an amount ranging from 15 to 65 parts per 100 parts of the copolymer.

8 Claims, No Drawings ive the block copolymer, a plasticizer in an
HIGH STRENGTH ELASTOMERS FOR PHARMACEUTICAL PRODUCTS

FIELD OF THE INVENTION

This invention relates to soft thermoplastic elastomeric compositions which are soft and have high tensile strength.

BACKGROUND OF THE INVENTION

The need for a soft, strong, thermoplastic elastomer for pharmaceutical or medical products continues to exist even though many new materials have been developed. Some materials have some of the desired properties, to some degree. Silicone can be formulated into soft, strong, products but in many applications, silicone products are far too expensive, particularly when large quantities of the products are to be produced. Nothing presently available gives a unique combination of low hardness and useful strength at a resonable cost. Particularly of interest would be products having low hardness and high strength along with some amount of clarity.

Various combinations of synthetic materials have been attempted in order to achieve various end product properties. In U.S. Pat. No. 4,598,123, clear cast acrylic sheets of improved impact strength are prepared by dissolving or dispersing a minor amount of an ABA block copolymer into a methyl methacrylate casting mixture which contains some styrene, followed by polymerization in sheet form via heating with an initiator. The resulting product had improved impact resistance and some formulations remained clear. The hardness, based on the Rockwell R Scale, was at least 77, indicating a very hard product.

Another formulation is described in U.S. Pat. No. 4,440,815. In this patent, 45% to 70% by weight of a polyolefin such as polypropylene is mixed with from 5% to 25% of an ethylene/lower alkyl acrylate copolymer and 10% to 40% of an ethylene butulene block copolymer having terminal styrene blocks. The material is stated to be suitable for sheet extrusion, injection molding or blow molding into flexible, transparent, autoclavable intravenous solution containers which withstand heavy impact during shipment and which also is sufficiently flexible to collapse during drainage of intravenous solutions. The product produced in Example 4 of that patent indicates a hardness on a Shore A Scale of 52, which is still considered to be very hard for many applications.

A strong and soft theromplastic elastomer is still not available for the medical and pharmaceutical industries. Such an elastomer, particularly if it could be produced with some clarity, would form the basis of many practical and useful formulations.

SUMMARY OF THE INVENTION

The present invention provides a new thermoplastic elastomeric composition which is admirably suited for use in the medical and pharmaceutical industry. The thermoplastic elastomer is soft and strong, so that it can be made into a variety of products. Some formulations produce clear products.

Specifically, the instant invention provides a soft, high strength thermoplastic elastomeric composition which comprises an ethylene butylene block copolymer having terminal polystyrene units, a plasticizer in an amount sufficient to soften the ethylene butylene phase of the copolymer, and a thermoplastic acrylic resin in an amount ranging from 15 to 65 parts per 100 parts of the block copolymer.

The elastomer is formed simply by melt blending and incurs no mixing, temperature or processing problems.

The preferred plasticizer is a high boiling point petroleum distillate such as mineral oil, and is contained in an amount ranging from about 30 to 150 parts of plasticizer per 100 parts of block copolymer. Another preferred plasticizer is a high molecular weight polybutene. Preferred thermoplastic acrylic resins are lower alkyl acrylate polymers or copolymers, particularly where the alkyl group is selected from methyl, ethyl and butyl. A preferred range for the amount of resin ranges from about 15 to 40 parts per one hundred parts of said block copolymer.

Products having a Shore A hardness of less than 40, and in some instance less than 20 or 25, are strong, having a tensile strength above 1500 PSI or even 2000 psi or more.

DETAILED DESCRIPTION OF THE PREFERRED EMBODIMENT

Many of the thermoplastic elastomers which comprise the present invention have an optical clarity which is very desirable and which is also unexpected. Products containing (1) the ethylene butylene block copolymer with terminal polystyrene units, (2) a plasticizer and (3) a thermoplastic acrylic resin are formulated with conventional additives to produce thermoplastic elastomers which have many uses in the medical and pharmaceutical industries. The high strength, low modulus and the softness which these compositions have, makes these thermoplastic elastomers highly suitable as the foundation material which can be fabricated into a variety of products. Particularly of interest are soft, strong baby bottle nipples, especially those which have at least some degree of clarity.

The ethylene butylene block copolymers which form a basic component of the present thermoplastic elastomer are ethylene butylene copolymers which have terminal polystyrene units. These polymers are commercially available from Shell Chemical Company under the trademark Kraton G. Block copolymers described in U.S. Pat. No. 3,686,364 and U.S. Pat. No. 3,865,776 are typical examples of the block copolymers contemplated by the present invention. In the latter patent, assigned to Shell Oil Company, copolymers are described as having ethylene butylene central blocks of from 50 to 80 percent by weight of the copolymer molecule in approximately equal proportions of ethylene and butylene. The terminal blocks are polystyrene. These ethylene butylene block copolymers having terminal polystyrene units are referred to by the shorthand designation of SEBS copolymers. This basic component of the thermoplastic elastomers of the present invention is present in an amount by weight ranging from about 30% to about 70%. However, for the purposes of describing the products, the formulations ar based on 100 parts of SEBS.

The above referenced patents which describe the SEBS copolymers describe the use of various plasticizers which function to soften the ethylene butylene phase of the copolymer. This increases the processability of SEBS as well as modifies the final product properties. A typical plasticizer is a petroleum distillate byproduct usually having a relatively high boiling point. One preferred example of a plasticizer is mineral oil. The amount of mineral oil which is employed is sufficient to soften the ethylene butylene phase of the SEBS copolymer. Tyipcally, this amount will range from 30 to about 150 parts per 100 parts of SEBS. More preferred is a range from about 70 to 150 parts of plasticizer and most preferably between 70 and 110 parts of plasticizer per 100 parts of SEBS.

The remaining component of the high strength soft thermoplastic elastomeric compositions is a thermoplastic acrylic resin in an amount ranging from about 15 to about 65 parts per 100 parts of SEBS copolymer. Preferred thermoplastic acrylic resins are the lower alkyl acrylate polymers or copolymers, particularly those where the alkyl group is selected from methyl, ethyl and butyl.

One preferred source of acrylic resins are the thermoplastic acrylic ester resins manufactured under the tradename ACRYLOID by the Rohm and Haas Company. These lower alkyl acrylate polymers or copolymers primarily have alkyl groups selected from methyl, ethyl and butyl.

A number of experiments were performed to demonstrate the efficacy of this invention. In each case, the formulation was prepared by making a dry blend of the mixture of SEBS, plasticizer and acrylic resin. These materials were melt mixed in a Banbury mixer and granulated. The particles were then molded to make samples which were then evaluated as will be described below. The samples prepared for the examples described herein presented no mixing problems, had no processing difficulties and did not require unusual melt temperatures. Other variations of conventional techniques for making thermoplastic elastomeric compositions may be used as well.

Physical properties were measured on a series of thermoplastic compositions containing different thermoplastic acrylic resins in formulations with 100 parts of SEBS and 80 parts mineral oil as a plasticizer. All of these various thermoplastic acrylic resins combined to form soft, strong thermoplastic elastomeric compositions which had clarity. The hardness was measured using a Shore A durometer and the tensile strength by ASTM standard methods was also measured. Presented below in Table I are the results of various tests made from a series of different thermoplastic acrylic resins containing compositions according to the invention. As will be noted, the thermoplastic elastomeric composition were soft, having a Shore A hardness of less than 40 and were strong, having a tensile strength of at least 1500. All of the products produced were clear. These results are surprising.

TABLE I

| Example Number | Thermoplastic acrylic resin, 15 parts with 100 parts SEBS and 80 parts mineral oil | Hardness, Shore A | Tensile, PSI | Clear |
|---|---|---|---|---|
| 1 | methyl methacrylate | 36 | 1640 | Yes |
| 2 | isobutyl methacrylate | 34 | 1770 | Yes |
| 3 | methyl/butyl methacrylate | 31 | 1670 | Yes |
| 4 | ethyl methacrylate | 30 | 1990 | Yes |
| 5 | methyl/butyl methacrylate | 29 | 1760 | Yes |

As can be seen, a variety of thermoplastic acrylic resins are capable of producing clear, soft, strong thermoplastic elastomers for use in the medical and pharmaceutical industry. All of the experiments shown in Table I have produced clear thermoplastic elastomers.

Additional experiments were performed, using the methyl/butyl methacrylate copolymer of Example 5 above, in order to produce products with varying quantities of plasticizer or acrylic resins. As can be seen in Table II below, the amount of plasticizer and the amount of acrylic resin can be varied greatly while still producing soft, strong quality products. It should be noted that a formulation without plasticizer produced a very hard product, while a formulation without the acrylic resin has substantially no strength.

TABLE II

| Example Number | Mineral Oil, parts per 100 parts SEBS | Acrylic Resin, parts per 100 parts SEBS | Hardness Shore A | Tensile PSI |
|---|---|---|---|---|
| 6 | 0 | 40 | 93 | 2690 |
| 7 | 110 | 0 | 10 | 60 |
| 8 | 70 | 15 | 36 | 1690 |
| 9 | 80 | 15 | 30 | 1800 |
| 10 | 90 | 15 | 26 | 1680 |
| 11 | 110 | 15 | 22 | 1520 |
| 12 | 80 | 25 | 35 | 1620 |
| 13 | 100 | 25 | 25 | 1770 |
| 14 | 90 | 35 | 35 | 1840 |
| 15 | 110 | 35 | 27 | 1560 |
| 16 | 110 | 40 | 28 | 1580 |
| 17 | 150 | 40 | 18 | 1530 |
| 18 | 100 | 45 | 34 | 1620 |

Formulation of several of the above examples were molded into soft, strong plastic objects useful for the pharmaceutical and medical industries. The resulting products can be manufactured into baby bottle nipples, tubing and the like. Formulations as described above, with a hardness of less than 40, Shore A, and a tensile strength above 1500 have great utility in the pharmaceutical industry. These formulations demonstrate superior softness along with a strength and integrity above that which is required.

Ingredients such as antioxidants, fillers, coloring agents, processing aids, and other conventional additives normally used in the formulation of thermoplastic elastomers may be used in specific formulations when practicing the present invention.

While particular embodiments of the present invention have been illustrated and described herein, it is not intended to limit the invention and changes and modifications may be made therein within the scope of the following claims.

What is claimed is:

1. A soft, high strength thermoplastic elastomeric composition having clarity and a Shore A hardness of less than about 30 and a tensile strength greater than 1500 PSI, comprising:
   an ethylene butylene block copolymer having terminal polystyrene units;
   a quantity of mineral oil in an amount ranging from about 70 to about 150 parts per 100 parts of copolymer; and
   a thermoplastic lower alkyl acrylate polymer in an amount ranging from about 15 to about 40 parts per 100 parts of copolymer, said polymer formed from monomers consisting of one or more lower alkyl acrylate monomers.

2. The elastomer of claim 1, which is formed by melt mixing.

3. The composition of claim 1, wherein the alkyl group is selected from methyl, ethyl and butyl.

4. A soft, high strength thermoplastic elastomeric composition having a Shore A hardness of less than about 30 and a tensile strength greater than about 1500 PSI for use in medical and pharmaceutical products, consisting essentially of a homogeneous blend of:
- an ethylene butylene block copolymer having terminal polystyrene units;
- a high boiling point petroleum distillate plasticizer in an amount ranging from about 70 to about 150 parts per 100 parts of said copolymer; and
- a thermoplastic acrylic lower alkyl acrylate polymer in an amount ranging from about 15 to about 40 parts per 100 parts of said copolymer, said polymer being formed from monomers consisting of one or more lower alkyl acrylate monomers.

5. The composition of claim 4, which is formed by melt mixing.

6. The composition of claim 4, wherein said petroleum distillate is mineral oil.

7. The composition of claim 6, wherein said mineral oil is present in an amount ranging from about 70 to about 150 parts per 100 parts of copolymer.

8. The composition of claim 4, wherein the alkyl group is selected from methyl, ethyl and butyl.

* * * * *